Dec. 31, 1957  G. W. VAN OOSTERHOUT ET AL  2,818,551
FERROMAGNETIC BODY
Filed Jan. 6, 1954
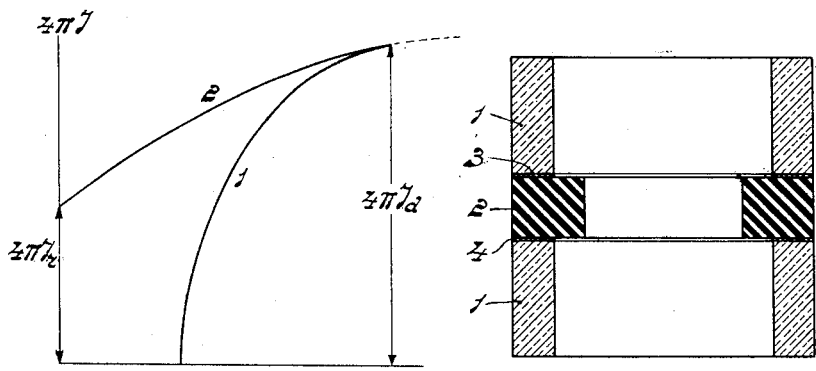
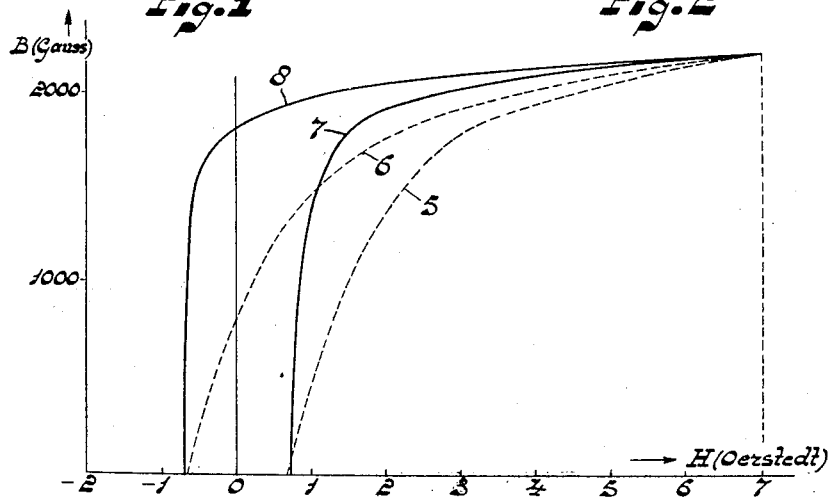
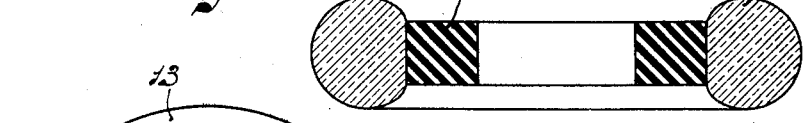
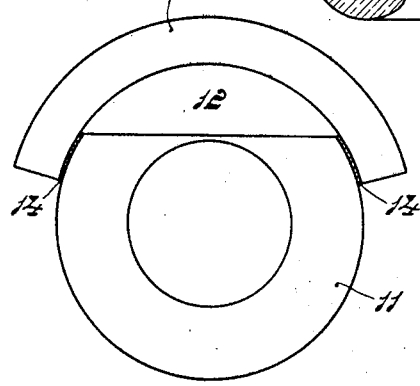
INVENTORS
GERARD WILLEM VAN OOSTERHOUT
GERHART WOLFGANG RATHENAU
JAN SMIT
BY
AGENT

2,818,551

FERROMAGNETIC BODY

Gerard Willem Van Oosterhout, Gerhart Wolfgang Rathenau, and Jan Smit, Eindhoven, Netherlands, assignors, by mesne assignments, to North American Philips Company, Inc., New York, N. Y., a corporation of Delaware Application January 6, 1954, Serial No. 402,432

Claims priority, application Netherlands January 7, 1953

7 Claims. (Cl. 336—212)

It is known (vide Becker and Döring: Ferromagnetismus, 1939, pages 103 and 104, and Preisach: Physikalische Zeitschrift 33, 1932, page 913) that the shape of the hysteresis curve of a ferromagnetic material may be acted upon by exerting a tensile or compressive stress on the material. In principle, it is thus possible to obtain a rectangular shape of the hysteresis curve. The manner in which the tensile or compressive stress acts upon the shape of the hysteresis curve is determined by the sign of the magnetostriction. With ferromagnetic materials of positive magnetostriction, for example, certain nickel-iron alloys (these alloys will consequently expand in the direction of the magnetic field applied), an approximately rectangular shape of the hysteresis curve may be obtained by exerting a tensile stress on the material. On the other hand, in the case of ferromagnetic substances of negative magnetostriction the hysteresis curve assumes more and more the rectangular shape, if the magnet core is subjected to an increasing compressive stress. Ferromagnetic ferrites, including mixed ferrites have, in general, a negative magnetostriction and thus tend to shrink in the direction of the magnetic field applied. The term "magnetostriction" is to be understood to means herein the linear saturation magnetostriction $\lambda_s$ at room temperature, obtained by extrapolating the relative variation in length $$\frac{\Delta l}{l}$$

plotted against the field strength, from very high values of the field strength back to the value zero of the field strength.

The invention will be described in connection with the accompanying drawing in which:

Fig. 1 shows a portion of a hysteresis curve of a rectangular hysteresis loop material;

Fig. 2 is a sectional view of a core made in accordance with the invention;

Fig. 3 shows for purposes of comparison portions of hysteresis loops of a prior art core and one made in accordance with the invention;

Fig. 4 is a view partly in section of a core made in accordance with the invention; and Fig. 5 is a plan view of another embodiment of a core according to the invention.

The measure in which the shape of the hysteresis curve approximates that of a rectangle may be expressed quantitatively by the quotient $$\frac{I_d - I_r}{I_r}$$

These symbols $I_d$ and $I_r$ will be explained hereinafter with reference to Fig. 1. It is known that the equation $B = H + 4\pi I$ may be applied, wherein B designates the inductance in Gauss, H the internal field strength in oersted and I the magnetisation. Referring to Fig. 1, reference numeral 1 designates the ascending branch and 2 the descending branch of the magnetisation curve of a ferromagnetic material. If the descending branch is prolonged, it intersects the vertical coordinate axis at the value $Br = 4\pi I_r$, wherein $I_r$ designates the retentivity, i. e. the magnetisation which remains after the field strength, subsequent to saturation, has been reduced to zero value again. The symbol $I_d$ designates the value of the magnetisation at which the hysteresis curve completes its loop, i. e. the value at which the ascending branch and the descending branch of the magnetisation curve coincide at still higher field strength. It is obvious that in the theoretical extreme case of an exactly rectangular hysteresis curve $I_r$ is equal to $I_d$.

Of late years the interest in magnet cores having an approximately rectangular shape of the hysteresis curve has strongly increased. This kind of core is used for so-called magnetic memories (vide for example W. N. Papian: Proceedings of I. R. E., April 1952, pages 475 to 478). In the construction of units required for such arrangements economy of space plays an important part. If it is desired to make use of the aforesaid principle, in accordance with which magnet cores having an approximately rectangular hysteresis curve are obtained by means of tensile or compressive stress, the magnet core may, for this purpose, be fixed in a clamping device which supplies the required tensile or compressive stress. However, such a device requires, in general, a comparatively large space, so that it is not efficient to use it for the aforesaid purpose. With the use of the same principle the invention has for its object to provide an important economy in space.

The magnet core may, in principle, be made from ferromagnetic alloys, for example, nickel-iron alloys, or from ferromagnetic ferrites. In the increasing use of ferromagnetic materials having a substantially rectangular hysteresis curve at high frequencies the tendency is to suppress eddy-current losses as much as possible. In the use of ferromagnetic alloys this may be obtained by building up the magnet cores from very thin layers of the ferromagnetic material, insulated from one another. However, it is often extremely difficult, if not impossible, to make these layers sufficiently thin. At these high frequencies it is therefore advantageous to use ferromagnetic ferrites which have by nature a very poor electrical conductivity.

Although the quotient $$\frac{I_d - I_r}{I_r}$$

is the most appealing measure for the "rectangularity" of the hysteresis curve, it is, in practice possible to derive the magnitudes $I_r$ and $I_d$ from measured magnitudes only in the simple case in which the magnet core is constituted by a ring, of which the difference between the inner diameter and the outer diameter is small with respect to the inner diameter and in which the sectional area of the magnetic material is constant throughout the circumference of the ring. The relationship between B and H on the one hand and the measured magnitudes $\Phi$ and $i$ on the other is in this case determined by the equations:

$$B = \frac{\Phi}{0}$$

Gauss and $$H = \frac{0.4\pi ni}{l} \text{ oersted}$$

wherein:

$\Phi$ designates the magnetic flux in Gauss per cm.$^2$, $i$ the current strength in ampere,
0 the sectional area of the magnetic material in cm.$^2$,
$l$ the average of the inner circumference and the outer circumference of the magnet core in cms.,
$n$ the number of wire turns about the core.

For the manner in which $\Phi$ may be determined as a function of $i$ reference is made to, for example, Bozorth: Ferromagnetism, 1951, pages 843 ff.

If the core is not shaped in the aforesaid simple form the following difficulties arise. The magnitudes H and B do not possess the same value throughout the core and moreover, if stray occurs, the magnitude $\Phi$ need not have the same value in each sectional area of the magnetic material. Moreover, the condition that $i$ should be equal to zero does not necessarily imply that the condition $H=0$ should be fulfilled throughout the core. Only the relationship $\Phi Hdl = 0$ must be fulfilled on each closed path not including current conveying conductors. It is thus no longer possible to refer to the magnitudes H, B and I of the core; instead reference must be made to the magnitudes H, B and I of the material at a given point of the core. Since it is in general not possible to measure these magnitudes, it can not be stated at what current strength at a given point the equation $H=0$ applies, nor when the magnetisation has assumed the value $I_r$. Therefore in practice recourse must be had to measurable magnitudes, so that the magnitudes: $\Phi$, the magnetic flux in a given sectional area, $\Phi$, the value of the flux in a given sectional area, at which the curve providing $\Phi$ as a function of the product $n \times i$ completes its loop (cf. the aforesaid definition of the magnitude $I_d$); $\Phi_o$, the value which the flux assumes in a given sectional area when $i$ is again reduced to the zero value subsequent to magnetic saturation, are introduced.

As a practical measure for the "rectangularity" the quotient $$R = \frac{\Phi_d - \Phi_o}{\Phi_o}$$

is introduced, wherein $\Phi_d$ and $\Phi_o$ refer to the same sectional area. The magnitude R is defined for a given sectional area of the core and may, consequently, differ for different sectional areas.

The magnitude R has the advantage that it is measurable, important for practical purposes and substantially equal to the quotient defined above of $$\frac{I_d - I_r}{I_r}$$

at low field strengths for the aforesaid simple case of an annular core, of which the difference between the inner diameter and the outer diameter is small with respect to the inner diameter and in which the sectional area of the magnetic material is constant throughout the circumference of the core.

The invention relates to a device comprising a magnet core of a ferromagnetic ferrite material, provided for at least part of its surface with at least one layer of glass, enamel or a different ceramic material having a specific resistance of more than 10 ohm/cm. (in order to suppress substantially eddy current losses) and an average expansion coefficient, in the temperature range between room temperature and the temperature at which the assembly must no longer be considered to be rigid, differing from the mean expansion coefficient of the ferromagnetic material in the same temperature range in a manner such that the value of the quotient R (defined above), measured at an arbitrary cross section of the magnet core, is at the most half of the value of the said quotient measured under the same conditions at the same area of the magnet core in the absence of the said layer(s) of glass, enamel or different ceramic material.

The term "the temperature at which the assembly must no longer be considered to be rigid" is to be understood to mean the lowest temperature at which any material forming part of the assembly starts to soften.

According to the invention, at least a portion of the core is coated with a vitreous material which produces in the ferrite core anisotropic compressive stress of a value such that the value of the quotient R drops below half its value in the unstressed ferrite core. It is obvious that such an anisotropic compressive stress can not be realised by coating the magnet core uniformly on all sides. In the device according to the invention this vitreous layer is either applied to part of the surface or to different parts of the surface in different thicknesses.

The value of the effect obtained by carrying out the invention varies with various magnetic properties of the ferrite material. It has been found that the value of this effect is determined by the absolute value of the quotient $$S = \frac{\lambda_s \mu_o}{\sigma^2 d_r d_s}$$

wherein $\lambda_s$ designates the linear saturation magnetrostriction at room temperature (defined above, $\mu_o$ the initial permeability in the absence of external stresses, $\sigma$ the saturation magnetisation per gram, $d_r$ the X-ray density and $d_s$ the "apparent" density (the weight divided by the external volume) of the ferrite material. In accordance with the invention use is preferably made of magnet cores of which at least part is made of a ferromagnetic ferrite material having an absolute value of the quotient S of more than $1.65 \times 10^{-8}$. Ferrite materials fulfilling this condition are, for example, nickel-zinc ferrites having a zinc content exceeding that corresponding to 25 mol. percent of zinc oxide in a total of nickel oxide, zinc oxide and ferric oxide.

In one of the embodiments of the invention the magnet core has the shape of a ring and the surface layer is provided on at least one of the annular boundaries. However, if desired, the surface layer may be applied to the sheath surface of the annular magnet core. In a further embodiment of the invention the core has a area of reduced cross-section, the core being subjected, by means of a strap, for example, of glass to a mechanical stress such that at the area of the smallest sectional area the greatest stress prevails. As an alternative, according to the invention, rings of glass or other ceramic material may be secured to a ring of a ferromagnetic ferrite material by means of a lower melting point glass or enamel.

The effect obtained by means of the invention will in general be the greater, the greater the difference between the expansion coefficients of the ferromagnetic ferrite material and the material of the surface layer. However, if the difference between these expansion coefficients is too great, the difficulty may arise that the cohesion of the surface layer is lost, so that these layers can no longer fulfil their function, i. e. the maintenance of the compressive stress. However, it depends, of course, on various kinds of minor factors, for example, adhesion or cohesion, whether a given material is suitable as a raw material for the surface layer.

Glass and enamel may, for example, be applied to the ferrite cores by immersing the latter in molten glass or enamel or in a suspension of glass or enamel. As an alternative, suspensions of glass or enamel may be applied by means of an enamel spray or paint spray to the ferrite core. These operations are followed up by a thermal treatment, during which the glass or enamel is sintered or melted tightly to the ferrite core. As a further alternative, a ring of glass or enamel may be caused to shrink about a ferrite ring by surface stress from a temperature in excess of the softening point or the glass may be secured to the ferrite core by means of a lower melting-point glass or enamel or by means of cement, for example, an ethoxyline resin, for example, a condensation product of poly-arylethylene oxide derivatives. For applying other ceramic materials than glass or enamel to a ferrite core, the latter method will be prefered.

If the mechanical resistance of the glass, enamel or other ceramic material should deteriorate in the course of time owing to atmospheric influences, it may be important to coat it with a layer of, for example, lacquer or silicon, protecting it from these influences.

In order that the invention may be readily carried into effect, it will now be described with reference to a few embodiments shown in the drawing.

*Example I*

A nickel-zinc ferrite is produced in a ratio of 17.5 mol. percent of nickel oxide, 33.3 mol. percent of zinc oxide and 49.2 mol. percent of ferric oxide as follows: Quantities of the aforesaid oxides in the said ratio are mixed in a mortar. The mixture is then ground in a rotating ball mill with alcohol for four hours. Then the alcohol is filtered out and the oxide mixture is dried and heated to about 800° C. in a furnace for two hours. Then the product is cooled and is ground with alcohol in the same ball mill for 16 hours, after which the alcohol is again filtered out and the product is dried. The powder thus obtained is mixed with 10 percent by weight of water, the mass obtained is pressed into blocks under a pressure of ¼ ton/cm.². These blocks are then powdered to such an extent that the powder passes a sieve having meshes of 0.5 mm. Then the mass is pressed under a pressure of ½ ton/cm.² into the form of rings. These rings are dried in the air and slowly heated in an electric furnace in air or oxygen to a temperature of 1250° C. to 1280° C. The latter temperature is maintained for two hours, after which the rings are slowly cooled. The material thus obtained has a mean expansion coefficient of about $91 \times 10^{-7}$ between 20° C. and 500° C., a magnetostriction $\lambda_s$ of $-4.2 \times 10^{-6}$, an initial permeability $\mu_0$ of 650, a saturation magnetisation $\sigma$ of 59.5, an X-ray density $d_r$ of 5.38 and an "apparent" density $d_s$ of 4.9. For this material the absolute value of the quotient $$S = \frac{\lambda_s \mu_o}{\sigma^2 d_r d_s} = 2.93 \times 10^{-8}$$

From the hysteresis curve is found for the unstressed ferrite material a value of the quotient $S=0.98$. The sintered ferrite rings have an outer diameter of 8 mms., an internal diameter of 4.2 mms., and a height of 1.7 mms.

Two glass rings having the same outer diameter as the ferrite rings and having an internal diameter of 5.8 mms. and a height of 3.0 mms., these rings being ground flat on one side, are introduced with the flattened end into enamel paste over about 1 mm. The glass has an unstraining temperature of 490° C. and a softening temperature of 670° C., while the mean expansion coefficient is about $100 \times 10^{-7}$ between 20° C. and 650° C. The enamel has a softening temperature of about 650° C. and an average expansion coefficient of about $120 \times 10^{-7}$ between 20° C. and 650° C.

Then the glass rings 1 introduced into the enamel paste (Fig. 2) are pressed on the ferrite rings 2, the glass and the ferrite being secured to one another by means of the enamel layers 3 and 4. If the ferrite material is slightly porous, it may be advantageous to cause it to absorb water previously. After the material has been dried, the excess of enamel may be removed by mechanical means. Then the construction is placed with its centre line in vertical position on a substratum, which is covered previously with a small quantity of aluminium oxide, in order to avoid tight baking during the subsequent heating. As a material for the substratum use may be made, in principle, of any refractory material.

Finally the construction is heated in a furnace to a temperature at which the enamel becomes liquid, i. e. in this case to a temperature of about 680° C. This temperature is maintained for 5 to 10 minutes, after which the construction is slowly cooled. Since the ferrite core is ring-shaped, the value of the quotient R is constant, no matter what part of the core is used for measuring the hysteresis curve. In the construction obtained the quotient R is found to have a value of 0.18. For the unstressed ferrite material this value, as said above, was 0.98. From Fig. 3 which shows the hysteresis curve 5—6 of the unstressed ferrite ring and the hysteresis curve 7—8 of the stressed ferrite ring, it is obvious that the form of the hysteresis curve of the ferrite ring approximates the form of a rectangle owing to the anisotropic stress exerted on the ring.

*Example II*

The same ferrite material and the same glass as described in Example I is now treated as follows. A ferrite ring 9 (Fig. 4) having an external diameter of 8 mms., an internal diameter of 4.2 mms., and a height of 1.7 mms., is lodged in a glass ring 10, in which it fits amply. The two rings are placed on a refractory substratum, covered with powdery alumina as referred to in Example I. The material is then heated to a temperature of about 700° C. to 800° C., so that the glass shrinks owing to surface strain. When the glass engages the ferrite ring on all sides, the construction is slowly cooled. In the construction thus obtained the quotient R of the ferrite core is found to have a value of 0.2. For the unstressed ferrite core this value, as referred to in Example I, was 0.98.

*Example III*

A glass strap 13 is placed with the aid of the enamel described in Example I on a ferrite ring 11 (Fig. 5) of the same ferrite material as described in Example I, of which the segment 12 (Fig. 5) is ground off. The glass of this strap is identical with that used in Example I. The glass strap is then baked tightly to the ferrite ring, in the manner described in Example I, by means of the intermediate layer of the same enamel as referred to in Example I. The value of the quotient R is measured at the area where the thickness of the ferrite core is smallest, i. e. near the segment 12. For the unstressed ferrite core a value of R of 1.8 is found; for the ferrite core of this construction a value of 0.37 is found.

*Example IV*

A construction as described in Example I is made, the ferrite material being, however, a nickel-zinc ferrite of a composition of 24.9 mol. percent of nickel oxide, 24.9 mol. percent of zinc oxide and 50.2 mol. percent of ferric oxide. This ferrite material has a mean expansion coefficient of $95 \times 10^{-7}$ between 20° C. and 500° C., a magnetostriction $\lambda_s$ of $-7.5 \times 10^{-6}$, an initial permeability $\mu_0$ of 230, a saturation magnetisation $\sigma$ of 73, an X-ray density $d_r$ of 5.38 and an "apparent" density $d_s$ of 4.3. For the quotient S is calculated an absolute value of $1.25 \times 10^{-8}$. The value of the quotient R is 1.72 for the unstressed ferrite ring; for the stressed ferrite ring in the construction obtained it is 0.39.

What is claimed is:

1. A ferromagnetic body comprising a core of ferromagnetic ferrite material and a layer of vitreous material covering at least a portion of said core and producing in said core an anisotropic compressive stress, said layer having a specific resistance of at least 10 ohms-cm. and an average temperature coefficient of expansion in a temperature range between ambient and a temperature at which one of said materials becomes plastically deformable which differs from the mean temperature coefficient of expansion of the ferrite in said temperature range an amount at which the anisotropic compressive stress in the core has a value at which the quotient, R, where $$\frac{I_d - I_r}{I_r} = R$$

$I_d$ being the magnetization of the ferrite material at which the hysteresis curve completes a loop and $I_r$ being the remanent magnetization of the ferrite, is less than one-half that of a like core of like cross-section without said vitreous layer.

2. A ferromagnetic body comprising a core of ferromagnetic ferrite material and a layer of vitreous material covering at least a portion of said core and producing in said core an anisotropic compressive stress therein, said ferrite having a value of S exceeding $1.65 \times 10^{-8}$, where $$S = \frac{\lambda \mu_o}{\sigma^2 d_r d_s}$$

$\lambda$ = linear saturation magnetostriction at ambient temperature;
$\mu$ = initial permeability in the absence of external stresses;
$\sigma$ = saturation magnetization per gram;
$d_r$ = X-ray density;
$d_s$ = apparent density (weight divided by external volume) of the ferrite; and said layer having a specific resistance of at least 10 ohms-cm. and an average temperature coefficient of expansion in a temperature range between ambient and a temperature at which one of said materials becomes plastically deformable which differs from the mean temperature coefficient of expansion of the ferrite in said temperature range an amount at which the quotient, R, where $$\frac{I_d - I_r}{I_r} = R$$

$I_d$ being the magnetization of the ferrite material at which the hysteresis curve completes a loss and $I_r$ being the remanent magnetization of the ferrite, is less than one-half that of a like core of like cross-section without said vitreous layer.

3. A ferromagnetic body comprising a core of ferromagnetic nickel-zinc ferrite having a zinc content corresponding to at least 25 mol. percent of ZnO in a total of NiO, ZnO, and $Fe_2O_3$, and a layer of vitreous material covering at least a portion of said core and producing in said core an anisotropic compressive stress therein, said layer having a specific resistance of at least 10 ohms-cm. and an average temperature coefficient of expansion in a temperature range between ambient and a temperature at which one of said materials becomes plastically deformable which differs from the mean temperature coefficient of expansion of the ferrite in said temperature range an amount at which the anisotropic compressive stress in the core has a value at which the quotient, R, where $$\frac{I_d - I_r}{I_r} = R$$

$I_d$ being the magnetization of the ferrite material at which the hysteresis curve completes a loop and $I_r$ being the remanent magnetization of the ferrite, is less than one-half that of a like core of like cross-section without said vitreous layer.

4. A ferromagnetic body as claimed in claim 3 in which said ferrite body has a portion of reduced cross-section which is covered with a layer of vitreous material for producing in said portion greater anisotropic compressive stress than in other portions of said core.

5. A ferromagnetic body as claimed in claim 3 in which a layer of lower melting point vitreous material is interposed between the core and said stress-producing layer for securing the same to said core.

6. A ferromagnetic body as claimed in claim 3 in which the vitreous layer is covered with a protective resin layer.

7. A ferromagnetic body as claimed in claim 3 in which the body is ring-shaped and the covering layer is provided on at least one of the annular peripheral surfaces of the body.

References Cited in the file of this patent
UNITED STATES PATENTS

| | | |
|---|---|---|
| 2,076,230 | Gillis | Apr. 6, 1937 |
| 2,568,881 | Albers-Schoenberg | Sept. 25, 1951 |